US010375633B2

United States Patent
Carty et al.

(10) Patent No.: US 10,375,633 B2
(45) Date of Patent: Aug. 6, 2019

(54) SYSTEM AND METHOD FOR PROVIDING POWER SAVINGS IN AN ACCESS POINT VIA ETHERNET RATE AND INTERFACE SHIFTING

(71) Applicant: Cisco Technology, Inc., San Jose, CA (US)

(72) Inventors: Clark Carty, San Jose, CA (US); Daniel Duckworth, San Jose, CA (US); Mark Pleso, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 89 days.

(21) Appl. No.: 15/374,572

(22) Filed: Dec. 9, 2016

(65) Prior Publication Data

US 2018/0167880 A1    Jun. 14, 2018

(51) Int. Cl.
H04W 52/02    (2009.01)
H04W 88/08    (2009.01)

(52) U.S. Cl.
CPC ... H04W 52/0212 (2013.01); H04W 52/0206 (2013.01); H04W 88/08 (2013.01); Y02D 70/00 (2018.01)

(58) Field of Classification Search
None
See application file for complete search history.

(56) References Cited

U.S. PATENT DOCUMENTS

| | | | |
|---|---|---|---|
| 9,253,120 B1* | 2/2016 | Dropps | G06F 13/426 |
| 2005/0271064 A1* | 12/2005 | Chang | H04W 88/06 |
| | | | 370/397 |
| 2010/0316065 A1* | 12/2010 | Kapil | G06F 13/385 |
| | | | 370/465 |
| 2014/0016637 A1* | 1/2014 | Masood | H04L 12/4013 |
| | | | 370/390 |

* cited by examiner

*Primary Examiner* — Saumit Shah
(74) *Attorney, Agent, or Firm* — Polsinelli PC (57) ABSTRACT

Disclosed is a method for managing bus channels between a physical layer and a media access channel layer of a network. The method includes determining a current rate of link speed on a media dependent interface side of a physical layer of a network architecture. When the current rate changes to yield a new link speed, the method includes determining a minimal (or near minimal) bus size required to implement the new link speed and switching to the minimal bus size between a physical coding sublayer of the physical layer and a reconciliation sublayer of a datalink layer of the network architecture. The method further includes switching to the minimal bus size between a physical coding sublayer of the physical layer and a reconciliation sublayer of a datalink layer of the network architecture.

16 Claims, 8 Drawing Sheets

SYSTEM AND METHOD FOR PROVIDING POWER SAVINGS IN AN ACCESS POINT VIA ETHERNET RATE AND INTERFACE SHIFTING

TECHNICAL FIELD

The present disclosure relates to power savings and more specifically to an algorithm for providing automatic rate shifting for power savings at an access point.

BACKGROUND

There are issues with the amount of power that buses use when communicating data between an Ethernet physical layer (PHY) and an Ethernet media access control (MAC) layer. Various interface such as xAUI (XAUI, RXAUI, etc.) and xMII (GMII, RGMII, SGMII, etc.) buses interconnect an Ethernet PHY and an Ethernet MAC (typically in a CPU). The more SerDes lanes that are utilized, the more power is used. A SerDes lane is a Serializer/Desirializer which is a pair of functional blocks commonly used in communication to compensate for limited input/output.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

There is a need for an algorithm that, upon the link speed of the media dependent interface (MDI) side of an Ethernet Physical Layer changing, changes the bus interface between the physical layer (PHY) and the media access control (MAC) layer to utilize the lowest amount of SerDes available to save power. The algorithm may also utilize not the absolute lowest amount but a lower amount of SerDes available to reduce power relative to other configurations. In some instances, implementing the concept can save about 0.5 W of power in an Access Point (AP). The present disclosure addresses the issues raised above with respect to the need for an approach changing the bus interface between the PHY layer and the MAC layer based upon the link speed of the MDI side of an Ethernet PHY changing to utilize the lowest amount of SerDes available to save power.

An example method includes determining a current rate of link speed on a media dependent interface side of a physical layer of a network architecture. When the current rate changes, the method includes determining a minimal (or near minimal) bus size required to implement the link speed and switching to the minimal bus size between a physical coding sublayer of the physical layer and a reconciliation sublayer of a datalink layer of the network architecture.

In another example, a method includes determining a link speed needed, determining available bus types and, based on the link speed needed and available bus types, setting a bus configuration between a physical coding sublayer of the physical layer of a network and a reconciliation sublayer of a datalink layer of the network to one of a lowest power mode, a medium power mode, and a highest power mode.

Description

The present disclosure addresses the issues raised above with respect to storing and managing large flow tables on switches. The disclosure provides a system, method and computer-readable storage device embodiments. First a general example system shall be disclosed in FIG. 1 which can provide some basic hardware components making up a server, node or other computer system.

Figure 1:
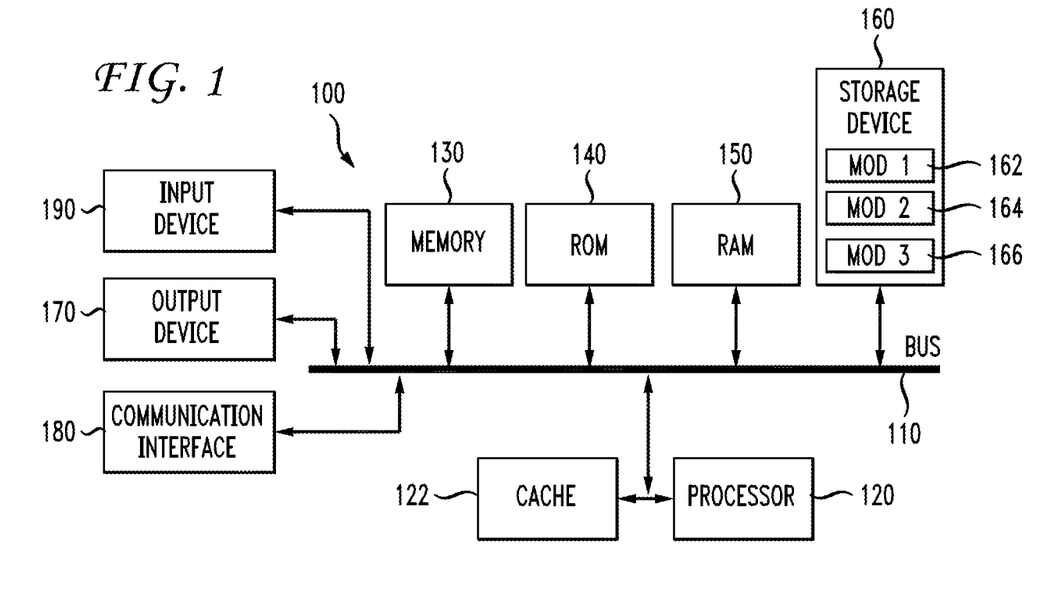
FIG. 1 illustrates an example system configuration.

FIG. 1 illustrates a conventional computing system architecture 100 wherein the components of the system are in electrical communication with each other using a bus 110. Exemplary system 100 includes a processing unit (CPU or processor) 120 and a system bus 110 that couples various system components including the system memory 130, such as read only memory (ROM) 140 and random access memory (RAM) 150, to the processor 120. The system 100 can include a cache 122 of high-speed memory connected directly with, in close proximity to, or integrated as part of the processor 120. The system 100 can copy data from the memory 130 and/or the storage device 160 to the cache 122 for quick access by the processor 120. In this way, the cache can provide a performance boost that avoids processor 120 delays while waiting for data. These and other modules can control or be configured to control the processor 120 to perform various actions. Other system memory may be available for use as well. The memory 130 can include multiple different types of memory with different performance characteristics. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

To enable user interaction with the computing device 100, an input device 190 can represent any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems can enable a user to provide multiple types of input to communicate with the computing device 100. The communications interface 180 can generally govern and manage the user input and system output. There is no restriction on operating on any particular hardware arrangement and therefore the basic features here may easily be substituted for improved hardware or firmware arrangements as they are developed.

Storage device 160 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 150, read only memory (ROM) 140, and hybrids thereof.

The storage device 160 can include software modules 162, 164, 166 which include instructions for controlling the processor 120. Other hardware or software modules are contemplated. The storage device 160 can be connected to the system bus 110. In one aspect, a hardware module that performs a particular function can include the software component stored in a computer-readable medium in connection with the necessary hardware components, such as the processor 120, bus 110, display 170, and so forth, to carry out the function.

As referenced above, the present disclosure provides for a novel approach to provide a look up or implement an algorithm that determines a minimal or reduced bus size and speed required to implement a link speed on the MDI side of the PHY and then switch to that bus size. The goal is to seek to arrive at the lowest amount of power draw or a reduced amount of power draw on one or both of the PHY or MAC side of the bus channel. The lookup approach can utilize a matrix of values that correlate a link speed and a bus channel configuration which takes into account the relative order of power draw from the various buses.

Figure 2:
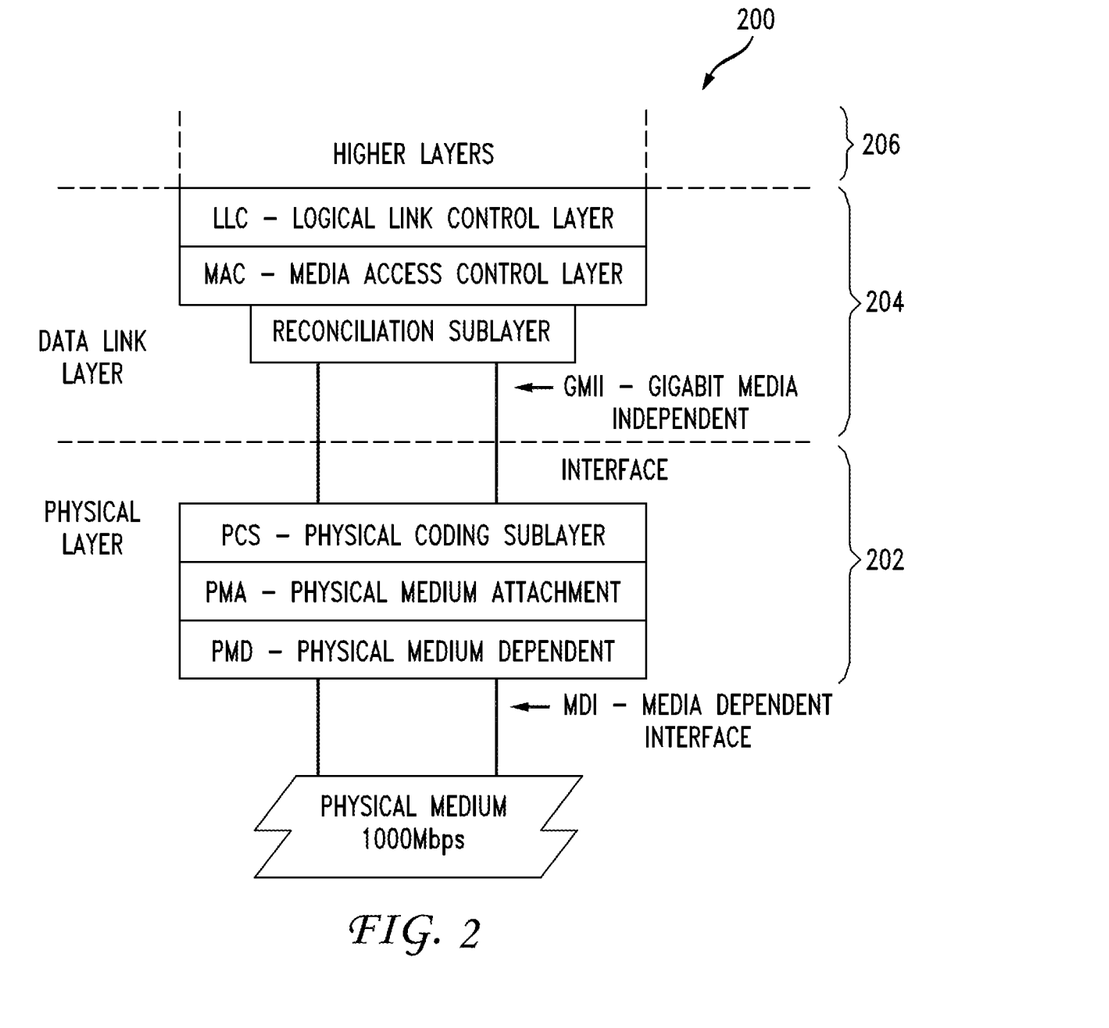
FIG. 2 illustrates general Ethernet protocol architecture.

FIG. 2 illustrates an Ethernet protocol architecture 200 which includes the physical layer 202, a deep link layer 204, and higher layers 206. The present disclosure focuses on the bus channel structure between the physical coding sublayer of the physical layer 202 and the reconciliation sublayer of the data link layer 204.

There is a correlation between an Ethernet link speed on the MDI side of the PHY layer 202 (100M, 1G, 2.5G, 5G, 10G, etc.) and the lowest speed at which the xAUI/xMII (media-independent interface) can run at to support that speed. The xAUI (attachment unit interface) is a standard for extending the 10 Gigabit Media independent Interface (SGMII) between the MAC layer and the PHY layer. The following is an example matrix which can be used or applied in the present disclosure:

100M, 1G-SGMII (Note: The SGMII is a TX/RX differential pair running at 1G)

2.5G-2500BASE-X (Note: The 2500BASE-X is a TX/RX differential pair running at 2.5G)

5G, 10G-RXAUI (Note: The RXAUI is 2 TX/RX differential pairs running at either 5G or 10G)

In the above matrix, it is assumed that the order of power draw from least to greatest is: SGMII<2500BASE-X<RXAUI. Of course other matrices or structures could also be applied given the desired link speed and available buses.

When the link speed of the MDI side of the PHY layer either increases or decreases from the current rate, a lookup is performed to determine the minimal PHY/MAC bus size and speed required to implement that speed and then switch to it. This ensures the lowest amount of power draw on either both the PHY and MAC side of the bus channel.

Figure 3:
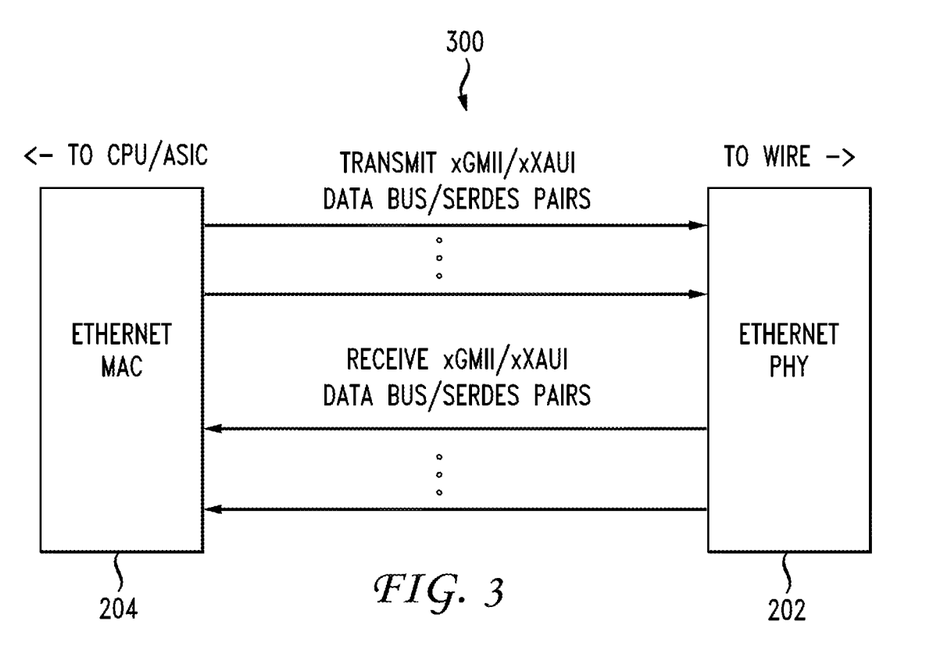
FIG. 3 illustrates transmit and receive data bus/SerDes pairs between the media access control layer and the physical layer.

FIG. 3 illustrates another configuration 300 which includes reference to the Ethernet physical layer 202 and the Ethernet MAC layer 204. Shown in between is a set of transmit xGMII/xXAUI data bus/SerDes Pairs and a set of receive xGMII/xXAUI Data Bus/SerDes pairs. Again, the concept disclosed herein involves switching to a particular one or more sets of data buses or SerDes pairs.

The concept disclosed herein focus on logic for power savings on the MAC interface side of an Ethernet PHY between the PCS and Reconciliation Sublayer (xGMII and xAUI) where nothing previously existed. The disclosed approach differs from standard auto-negotiation in that standard auto negotiation has no inherent knowledge of power draw or minimizing power draw. Also, auto negotiation is for the cable/wire PHY side of the bus channel. The concepts disclosed herein are about the MAC interface side.

With respect to automatic link downshift, automatic link downshift would only affect the cable/wire side of a PHY. The MAC interface side could still be set at the same, higher, more power consuming configuration after a cable/wire side link downshift.

Further, relative to Energy Efficient Ethernet (EEE), EEE is for the cable/wire side of the PHY layer. The present disclosure focuses on the MAC interface side. Once the peer speed is set, the logic disclosed herein will then determine what minimal (or reduced) power configuration to set the MAC interface side at. The process disclosed herein does not affect the peer speed.

Figure 4A:
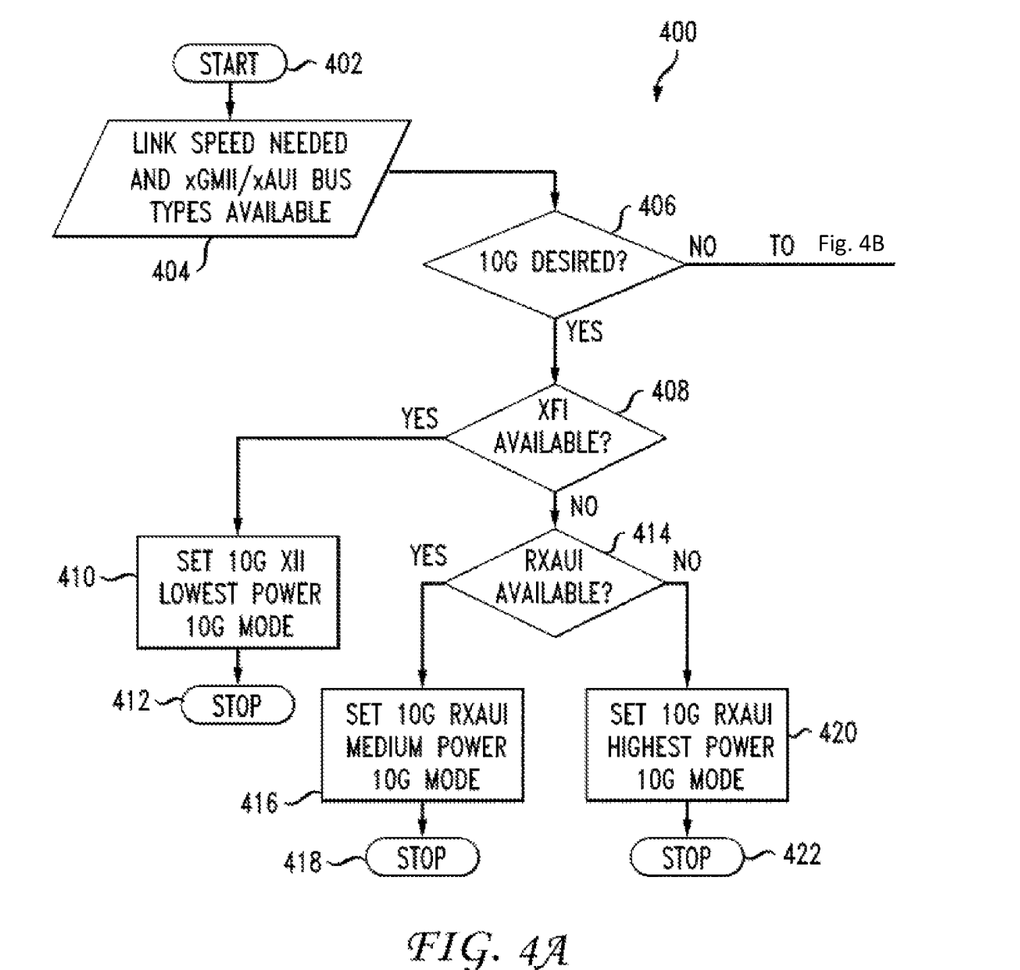
FIG. 4A illustrates a first portion of an example algorithm.

FIG. 4A illustrates an example first portion of an algorithm 400 for altering the bus configuration to save power. The algorithm starts (402) and initially determines what link speed is needed and what bus types are available (404). Example bus types include xGMII/xAUI. Of course other bus types may be included in the list of available bus types. The algorithm determines whether a 10G speed is desired (406). If yes, then the algorithm determined determines whether a 10G serial electrical interface (XFI) is available (408). If yes, then the algorithm sets the 10G XFI into a lowest power 10G mode (410) and the algorithm stops (412). The algorithm could also set simply a lower power 10G mode relative to other modes that would consume more power.

Is the XFI is not available, the algorithm determines whether an RXAUI interface is available (414). If yes, the algorithm sets a 10G RXAUI interface a medium power 10G mode (416) and stops (418). If the RXI is not available, then the algorithm sets the XAUI to a highest power 10G mode (420) and stops (422).

Figure 4B:
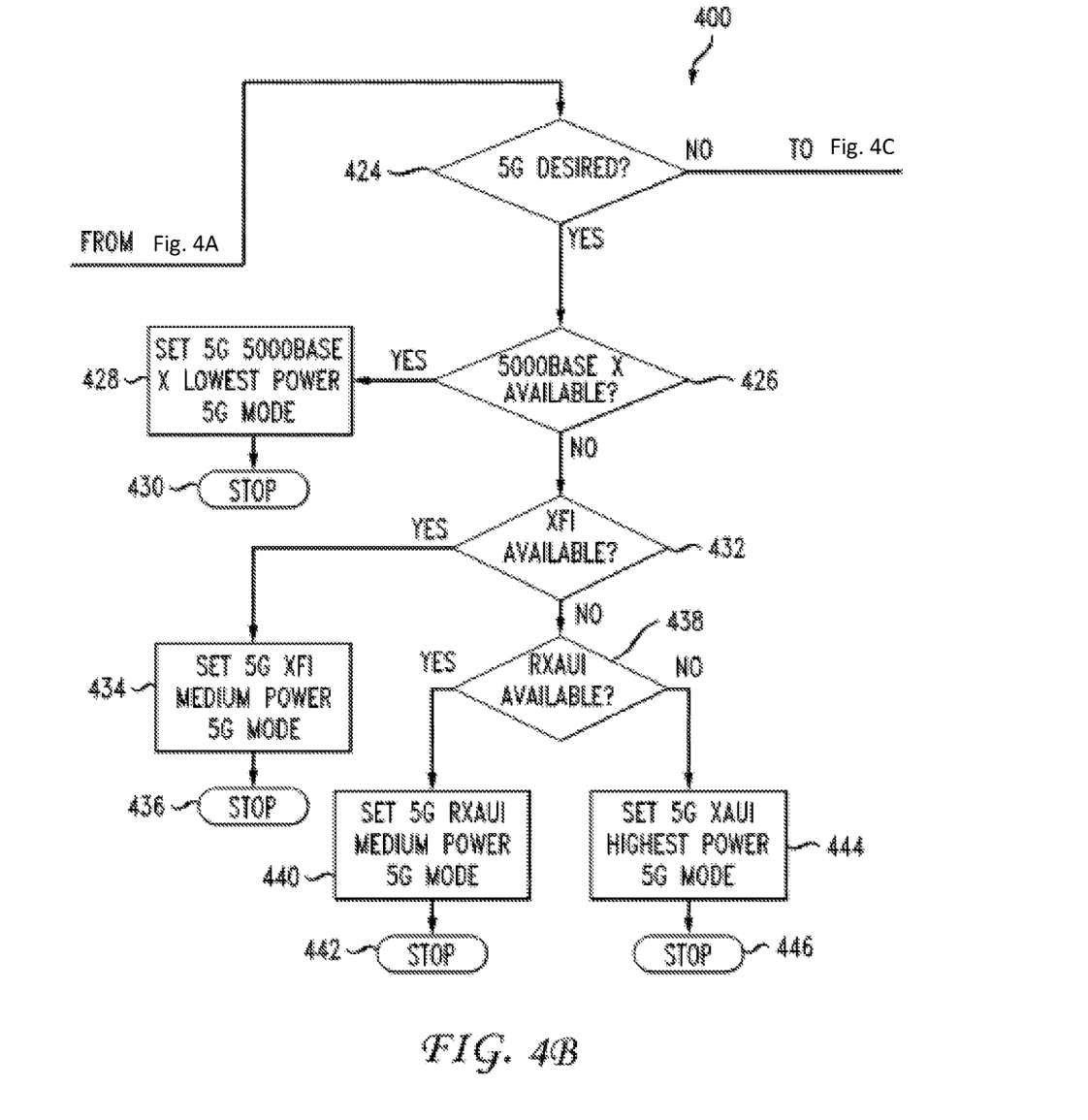
FIG. 4B illustrates a second portion of the example algorithm.

FIG. 4B illustrates a second portion of the algorithm 400. If, from FIG. 4A, the 10G speed is not desired, the algorithm determines whether a 5G speed is desired (424). If yes, the algorithm determines whether the 5000Base X interface is available (426). If yes, the algorithm sets the 5G 5000Base X interface to a lowest power 5G mode (428) and stops (430).

If the 5000Base X is not available, the algorithm determines whether the XFI is available (432). If yes, the algorithm sets a 5G XFI interface to a medium power 5G mode (434) and stops (436). If the XFI is not available, the algorithm determines whether the RXAUI is available (438). If yes, the algorithm sets a 5G RXAUI to a medium power 5G mode (440) and stops (442). If the RXAUI is not available, the algorithm sets a 5G XAUI to a highest power 5G mode (444) and stops (446).

Figure 4C:
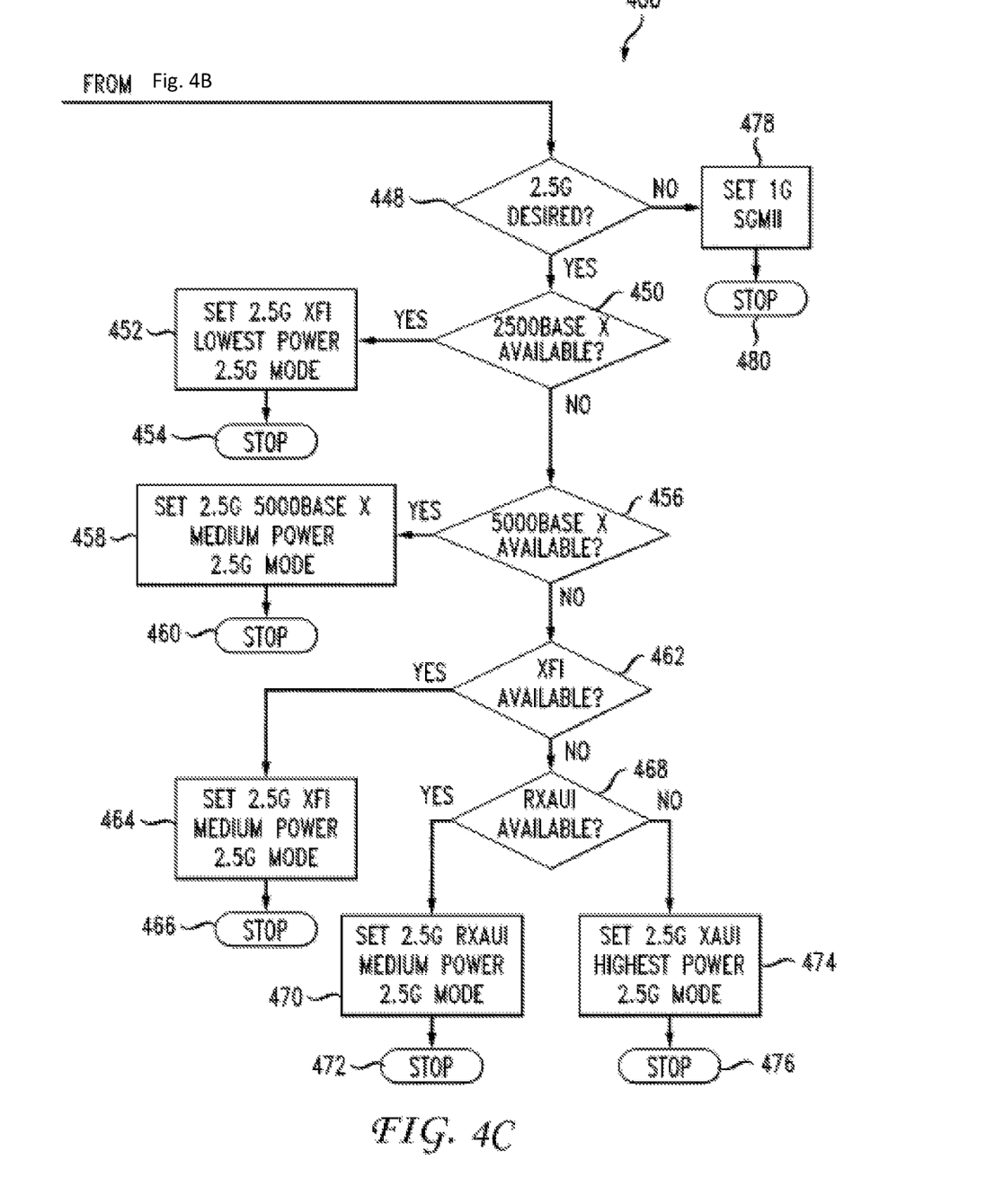
FIG. 4C illustrates third portion of the example algorithm.

FIG. 4C illustrates the last aspect of this disclosure. Assume that from FIG. 4B, it is determined that the 5G speed is not desired. In this scenario, the algorithm determines whether a 2.5G speed is desired (448). If yes, the algorithm determines whether a 2500Base X interface is available (450). If yes, the algorithm sets a 2.5G 2500Base X interface to a lowest power 2.5G mode (452) and stops (454). If the 2500Base X interface is not available, the algorithm determines whether a 5000Base X interface is available (456). If yes, the algorithm sets a 2.5G 5000Base X interface to a medium power 2.5G mode (458) and stops (460). If no, the algorithm determines whether an XFI is available (462). If yes, the algorithm sets a 2.5G XFI interface to a medium power 2.5G mode (464) and stops (466). If no, the algorithm determines whether an RXAUI interface is available (468). If yes, the algorithm sets a 2.5G RXAUI interface to medium power 2.5G mode (470) and stops (472). If no, the algorithm sets that 2.5G XAUI interface to a highest power 2.5G mode (474) and stops (476).

Further, if the algorithm determines that speed of 2.5G is not desired (448), the algorithm sets a 1G SGMII interface (478) and stops (480). The above described algorithm is provided only by way of example. Of course other interfaces, other speeds, other more general or specific modes can be implemented. For example, in some cases, a lowest power mode, a medium power mode, or a highest power mode is preferred. These modes could also be interpreted as relative power modes. For example, in one case, the algorithm may set a particular interface to a lower power mode relative to other interfaces although that lower power mode may not be the absolute lowest power mode available. Thus, the references herein to the various modes should not be interpreted as the algorithm requiring an absolute lowest mode, and absolute highest mode, or an absolute medium or median mode.

Figure 5:
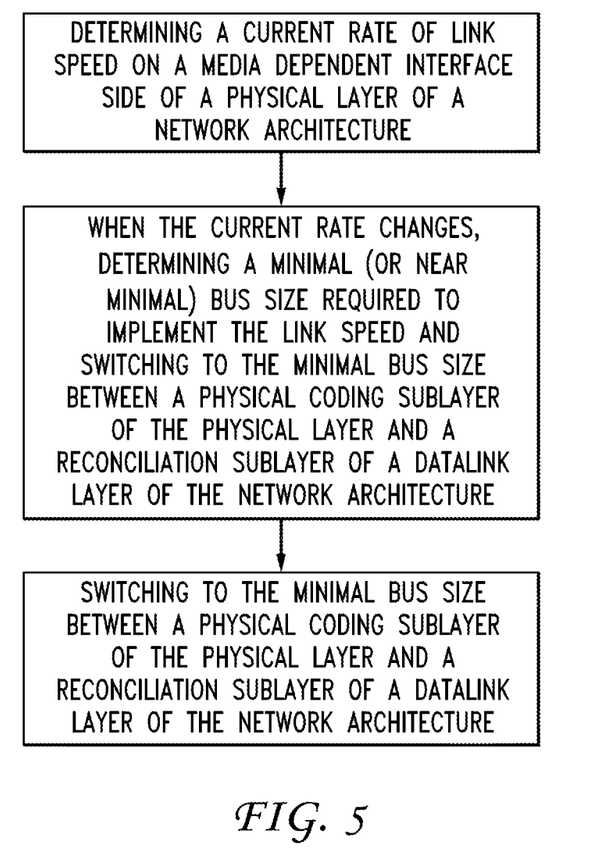
FIG. 5 illustrates a method embodiment.

FIG. 5 illustrates a method embodiment. A method includes determining a current rate of link speed on a media dependent interface side of a physical layer of a network architecture (502). When the current rate changes to yield a new link speed, the method includes determining a minimal (or near minimal) bus size required to implement the new link speed and switching to the minimal bus size between a physical coding sublayer of the physical layer and a reconciliation sublayer of a datalink layer of the network architecture (504). The method further includes switching to the minimal bus size between a physical coding sublayer of the physical layer and a reconciliation sublayer of a datalink layer of the network architecture (506). The MAC interface side can be either dynamically changed based on network traffic or other changes to the link speed. The bus size could also be set at configuration time as well. The minimal bus size can include a SerDes lane or a plurality of SerDes lanes.

Determining the minimal bus size can further include performing a lookup in a matrix or a table that stores data regarding a correlation between link speed and an order of a relative power draw between available buses. An algorithm could also be applied rather than a table lookup. In one example, the available buses include one or more of SGMII, 2500BASE-X, and RXAUI. Other defined buses existing currently or developed in the future can also be included in the algorithm or matrix/table. Determining the minimal bus size further can include determining a minimal speed for the minimal bus size required to implement the link speed. The minimal bus size can also include a bus size relatively smaller than other available bus sizes. In other words, reference to a minimal bus size does not necessarily indicate an absolute minimal bus size. Rather, the concept relates to seeking to reduce the power draw on either or both of the PHY or the MAC side of the bus channel. Accordingly, to the extent that a change is made in the bus configuration used between the PHY layer and the MAC layer, where the resulting bus configuration utilizes less power for an updated link speed than otherwise would be drawn, the updated bus configuration could be determined to be a minimal bus size. Other characterizations of this term could be a reduced power draw bus configuration or bus size.

Figure 6:
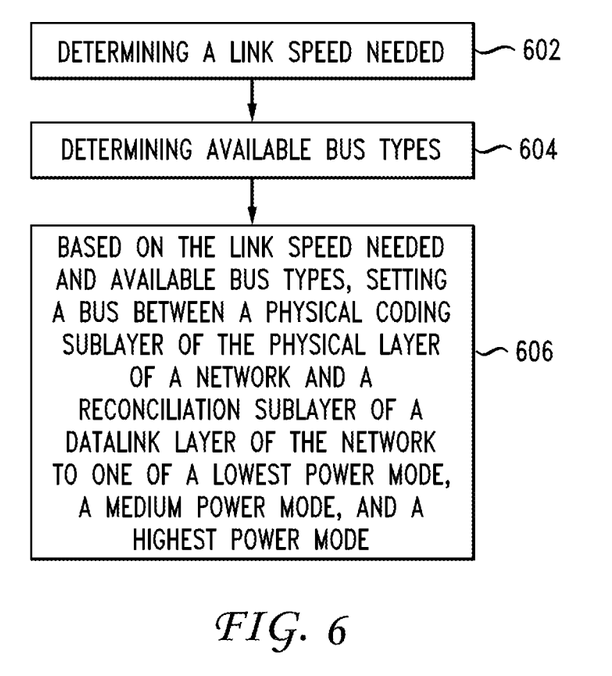
FIG. 6 illustrates another method embodiment.

FIG. 6 illustrates another method embodiment. A method includes determining a link speed needed (602), determining available bus types (604) and, based on the link speed needed and available bus types, setting a bus between a physical coding sublayer of the physical layer of a network and a reconciliation sublayer of a datalink layer of the network to one of a lowest power mode, a medium power mode, and a highest power mode (606). This method is a general description of what is disclosed above in FIGS. 4A-4C.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method for directing network traffic over a plurality of buses, each bus accommodating a corresponding maximum particular link speed, the method comprising:
    determining a current rate of link speed on a media dependent interface side of a physical layer of a network architecture;
    when the current rate changes to yield a new link speed, determining a minimal bus size required to implement the new link speed;
    selecting a bus from the plurality of buses that is (a) available and (b) has a lowest corresponding maximum speed that will accommodate the determined minimal bus size; and
    switching to the selected bus between a physical coding sublayer of the physical layer and a reconciliation sublayer of a datalink layer of the network architecture;
    wherein determining the minimal bus size further comprises performing a lookup in a matrix that comprises data regarding a correlation between link speed and an order of a relative power draw between available buses.

2. The method of claim 1, wherein the minimal bus size comprises a SerDes lane.

3. The method of claim 1, wherein the minimal bus size comprises a plurality of SerDes lanes.

4. The method of claim 1, wherein the plurality of buses comprise one or more of SGMII, 2500BASE-X, and RXAUI.

5. The method of claim 1, wherein determining the minimal bus size further comprises determining a minimal speed for the minimal bus size required to implement the new link speed.

6. The method of claim 1, wherein the minimal bus size comprises a bus size relatively smaller than other available bus sizes.

7. A system for directing network traffic over a plurality of buses, each bus accommodating a corresponding maximum particular link speed, the system comprising:
    a processor; and
    a computer-readable storage device storing instructions which, when executed by the processor, cause the processor to perform operations comprising:
        determining a current rate of link speed on a media dependent interface side of a physical layer of a network architecture;
        when the current rate changes to yield a new link speed, determining a minimal bus size required to implement the new link speed;
        selecting a bus from the plurality of buses that is (a) available and (b) has a lowest corresponding maximum speed that will accommodate the determined minimal bus size; and
        switching to the selected bus between a physical coding sublayer of the physical layer and a reconciliation sublayer of a datalink layer of the network architecture;
        wherein determining the minimal bus size further comprises performing a lookup in a matrix that comprises data regarding a correlation between link speed and an order of a relative power draw between available buses.

8. The system of claim 7, wherein the minimal bus size comprises one of a SerDes lane or a plurality of SerDes lanes.

9. The system of claim 7, wherein the plurality of buses comprise SGMII, 2500BASE-X, and RXAUI.

10. The system of claim 7, wherein determining the minimal bus size further comprises determining a minimal speed for the minimal bus size required to implement the new link speed.

11. The system of claim 7, wherein the minimal bus size comprises a bus size relatively smaller than other available bus sizes.

12. A non-transitory computer-readable storage device storing instructions for directing network traffic over a plurality of buses, each bus accommodating a corresponding maximum particular link speed, the instructions when executed by a processor cause the processor to perform operations comprising:

determining a current rate of link speed on a media dependent interface side of a physical layer of a network architecture;

when the current rate changes to yield a new link speed, determining a minimal bus size required to implement the new link speed;

selecting a bus from the plurality of buses that is (a) available and (b) has a lowest corresponding maximum speed that will accommodate the determined minimal bus size; and switching to the selected bus between a physical coding sublayer of the physical layer and a reconciliation sublayer of a datalink layer of the network architecture;

wherein determining the minimal bus size further comprises performing a lookup in a matrix that comprises data regarding a correlation between link speed and an order of a relative power draw between available buses.

13. The non-transitory computer-readable storage device of claim 12, wherein the minimal bus size comprises one of a SerDes lane or a plurality of SerDes lanes.

14. The non-transitory computer-readable storage device of claim 12, wherein the plurality of buses comprise one or more of SGMII, 2500BASE-X, and RXAUI.

15. The non-transitory computer-readable storage device of claim 12, wherein determining the minimal bus size further comprises determining a minimal speed for the minimal bus size required to implement the new link speed.

16. The non-transitory computer-readable storage device of claim 12, wherein the minimal bus size comprises a bus size relatively smaller than other available bus sizes.

* * * * *